United States Patent [19]
Kaufman

[11] Patent Number: 5,803,743
[45] Date of Patent: Sep. 8, 1998

[54] ALPHABET BLOCK BOOKS

[75] Inventor: Shari Kaufman, Westport, Conn.

[73] Assignee: Innovative USA, Inc.

[21] Appl. No.: 866,979

[22] Filed: Jun. 2, 1997

[51] Int. Cl.[6] .................................................. G09B 11/08
[52] U.S. Cl. .......................... 434/159; 434/403; 434/167; 434/191; 281/16; 281/51
[58] Field of Search .................................. 434/403, 159, 434/167, 172, 191, 188; 281/16, 51; 446/147, 901

[56] References Cited

U.S. PATENT DOCUMENTS

| | | |
|---|---|---|
| 3,822,487 | 7/1974 | Koch . |
| 4,280,241 | 7/1981 | Pfaff ...................................... 281/51 X |
| 4,508,347 | 4/1985 | Shettler ............................... 273/157 R |
| 4,819,963 | 4/1989 | Wolski ..................................... 281/15.1 |
| 4,838,828 | 6/1989 | Ohnuma et al. ......................... 446/446 |
| 5,018,764 | 5/1991 | Beardell ................................. 281/51 X |
| 5,165,894 | 11/1992 | Reasoner ................................. 434/345 |
| 5,383,684 | 1/1995 | Smath .................................... 281/51 X |
| 5,405,135 | 4/1995 | Embro .................................... 273/160 |
| 5,509,720 | 4/1996 | Croom ................................... 297/440 |
| 5,554,062 | 9/1996 | Goldsen ................................. 446/124 |

FOREIGN PATENT DOCUMENTS

| | | | |
|---|---|---|---|
| 2248582 | 4/1992 | United Kingdom ................... | 446/147 |

*Primary Examiner*—Jeffrey A. Smith
*Attorney, Agent, or Firm*—Hedman, Gibson & Costigan, P.C.

[57] ABSTRACT

A series of books having indicia printed on the outside thereof which cooperate when employed as building blocks is disclosed to function as an educational tool.

16 Claims, 4 Drawing Sheets

ALPHABET BLOCK BOOKS

The present invention relates to a book which is also useful as a building block. More particularly, the present invention is related to a series of books having indicia printed on the outside thereof which cooperate when employed as building blocks to function as an educational tool.

BACKGROUND OF THE INVENTION

Educational devices which are useful in teaching children how to read, use proper grammar, count and do basic arithmetic have long been sought after by educational professionals. It is further believed that these devices are even more valuable when the format of the device is one which is enjoyable for the learner. This is especially so in the case of young children whose attention spans are greatly increased when the format is one which is similar to a game.

In this regard, alphabetical blocks have long been a part of children's play and education and there are number of alphabet blocks which are available in the marketplace. These blocks take various sizes, shapes, designs, and may be made of a wide range of materials. See, for example, Koch, U.S. Pat. No. 3,822,487; Shettler, U.S. Pat. No. 4,508,347; Croom, U.S. Pat. No. 5,509,720 and Embro, U.S. Pat. No. 5,405,135. In another prior art embodiment, the blocks serve as rail for a running toy. Ohnuma et al., U.S. Pat. No. 4,838,828.

Such blocks however, convey no more information than what can be seen on the exterior surfaces and information is generally limited to the uppermost surface.

It is also known in the art that the educational format may be in the form of books puzzle sets. In Reasoner et al., U.S. Pat. No. 5,165,894 there is taught a set of books each having a single theme and a tray for holding the books. However, the books of Reasoner et al. '894 are specifically stated as not to be used in a block format, i.e. they can only be used in one dimension and cannot be formed into other objects.

Accordingly, there is exists in the art a need for an educational device which overcomes the limitations of the prior art devices, i.e., one which enables blocks to include information below the surface level and which enables books to be employed as blocks.

SUMMARY OF THE PRESENT INVENTION

It is therefore an object of the present invention to provide a set of books which are also useful as blocks.

It is a further object of the present invention to provide a set of books which are useful in teaching spelling.

It is another object of the present invention to provide a set of books which are useful in teaching reading.

It is a still further object of the present invention to provide a set of books which are useful in teaching sentence structure and grammar.

It is yet another object of the present invention to provide a set of books which are useful in teaching arithmetic.

It is another further object of the present invention to provide a set of blocks which can provide educational information in the interior of the block.

Accordingly, the educational device of the present invention in one aspect is useful for teaching students to recognize letters, spell words and/or read comprised of a series of books wherein each of the books comprises a front cover, at least one page and a back cover and is adapted for use as building block, wherein each of the books relates to at least one letter of the alphabet by printing the letter on one or more of the sides of the block and having at least one page having a theme the general topic of which is related to a letter printed on the side of the book.

In another aspect the present invention provides an educational device for teaching students to recognize numbers and/or learn basic arithmetic symbols which comprises a series of books wherein each of the books comprises a front cover, at least one page and a back cover and is adapted for use as building block, wherein each of the books relates to at least one numeral or arithmetic symbol by printing the numeral or arithmetic symbol on one or more of the sides of the block and having at least one page having a theme the general topic of which is related to a numeral or arithmetical symbol printed on the side of the book.

In still another aspect the present invention provides an educational device for teaching students to read and learn sentence structure which comprises a series of books wherein each of the books comprises a front cover, at least one page and a back cover and is adapted for use as building block, wherein each of the books relates to at least one word or grammatical symbol by printing the word or grammatical symbol on one or more of the sides of the block and having at least one page having a theme the general topic of which is related to a word or grammatical symbol printed on a side of the book.

DETAILED DESCRIPTION OF THE PRESENT INVENTION AND DESCRIPTION OF THE PREFERRED EMBODIMENTS

Figure 1:
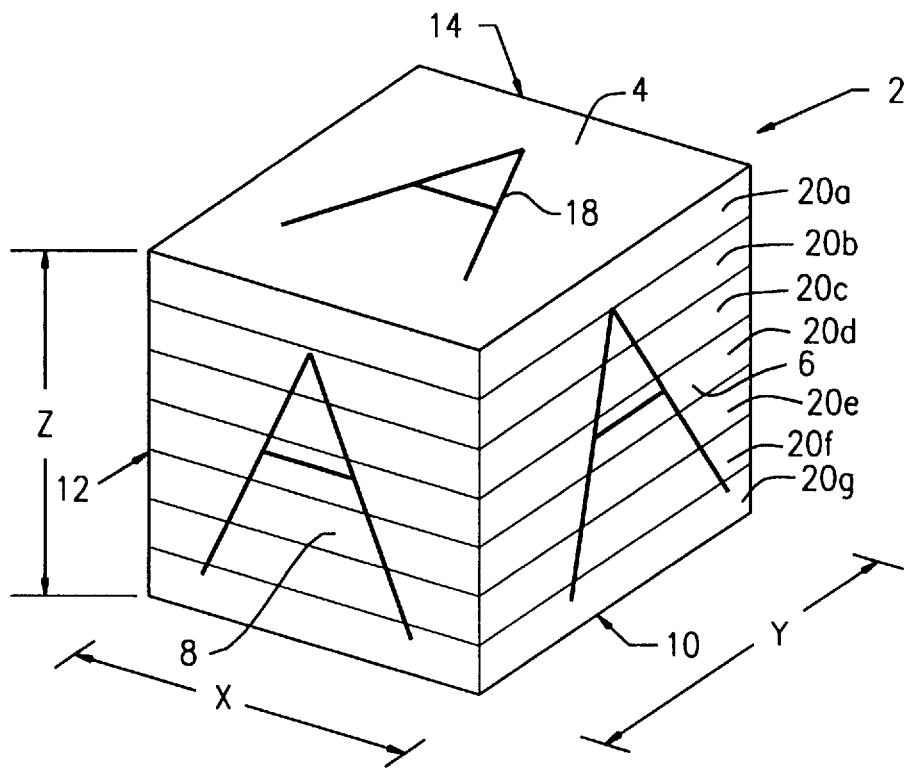
FIG. 1 is an angular top view of a book of the present invention.

Referring to FIG. 1, there is shown a book 2 suitable for use in the practice of the present invention. The book 2 has six sides 4, 6, 8, 10, 12 and 14. In the embodiment of FIG. 1, the book 2 is in the form of a cube and all six sides have essentially the same size. However, it will be appreciated by those skilled in the art that the book can be of any shape and size as long as the book 2 is suitable for use as a block.

In this regard it is preferred that the length x, the width y and the height z are all at least about one-half of an inch, preferably all at least about one inch, more preferably all at least about 1.5 inches and most preferably all at least about 2 inches. It is further preferred that the ratio of any two of x, y and z be less than about 3:1, more preferably less than about 2.5:1 and most preferably less than about 2:1. In this manner, the book 2 will suitably also function as a block. In an especially preferred embodiment, x ranges from 1.5 to 2.5 inches, y ranges from 1.5 to 2.5 inches and z ranges from about 0.75 to 2.5 inches.

The book 2 has printed on at least one of its outer sides or faces a character such as a letter, a word, a numeral, a mathematical symbol, or a grammatical symbol. In FIG. 1, the character 18 is the letter A and is printed on sides 4, 6 and 8. Although the character may be printed on only one side, it is preferred that the character be printed on two or more sides, most preferably at least three sides. The more sides which have the character appearing thereon, the more useful the book is as a block.

The book 2 is further comprised of pages 20a, 20b, 20c, 20d, 20e, 20f and 20g. Of course, any suitable number of pages may be employed from as little as two pages to as many as desired while still maintaining the ratios of x, y and z set forth hereinabove. Similarly, the pages may be of any desired thickness as long as the book itself has sufficient rigidity to function as a block. For example, the front cover 20a and back cover 20g may be comprised of a sturdy cardboard material, while the interior pages 20b, 20c, 20d, 20e and 20f may be comprised of a paper material. Alternatively, all of the pages may be constructed of a cardboard material.

Again each book of the present invention is directed to at least one theme which relates to the reference character printed on the exterior surface thereof. For example, in the book of FIG. 1, the character 18 on the exterior surface of the book is the letter "A." Accordingly, page 20a may show a picture of and spell out the word "apple;" page 20b may show a picture of and spell out the word "acorn;" page 20c may show a picture of and spell out the word "aardvark;" page 20d may show a picture of and spell out the word "antelope;" page 20e may show a picture of and spell out the word "avocado;", page 20f may show a picture of and spell out the word "axe;" and page 20g may show a picture of and spell out the word "artichoke."

Of course, a single letter does not have to appear on the side of the book. It is contemplated herein that letter combinations, such at "th", "ch", "ing" and other common combinations can be used to further teach spelling, enunciation and proper grammar.

Similar associations may be developed for all of the letters of the alphabet, numbers, mathematical symbols, grammatical symbols, words or letter combinations. Thus, a series of books may be developed which can be used as blocks to spell words in the case of books with letter characters; form mathematical equations in the case of books with numbers and mathematical symbol characters; form sentences in the case of books with word and grammatical symbol characters.

It is further contemplated that a book may have more than one letter, word, number or symbol printed on the outside. In this type of embodiment, for example, a book with six pages may have three of the sides printed with the letter B and three of the sides printed with the letter G. The first three pages of the book could show pictures and words relating to the letter B such as a boat, a boy and a banana; and the second three pages could show pictures and words relating to the letter G such as a goat, a gorilla and a guitar. Any other arrangement which is evident to those skilled in the art in light of this detailed description is also contemplated herein.

Of course, letters, words, numbers and symbols could also be mixed on the book blocks as well. In this type of embodiment a book could have the letter "C" printed on one side, the word "cat" printed on another side and the number "3" printed on a third side. At least one page of the interior of the book would be related to each of the letters printed on the exterior of the book. In this manner, one set of block books could be used for learning reading, spelling, letters, counting and arithmetic.

The number of block books in a set is not critical to the present invention and can vary widely. It is preferred that the set have at least one block book related to each of the letters of the alphabet for an alphabet series. A spelling series could employ block books with more than one letter printed thereon in order to allow for duplication of more common letters. A sentence series could vary depending on the age group that the series is directed to (more words and grammatical symbols with series directed at older children and only basic words for a series directed to younger children). A mathematical series would include at least one book for each of the numerals one to nine and the basic arithmetical symbols (plus sign, minus sign, equals sign, multiplication sign, division sign).

Figure 2:
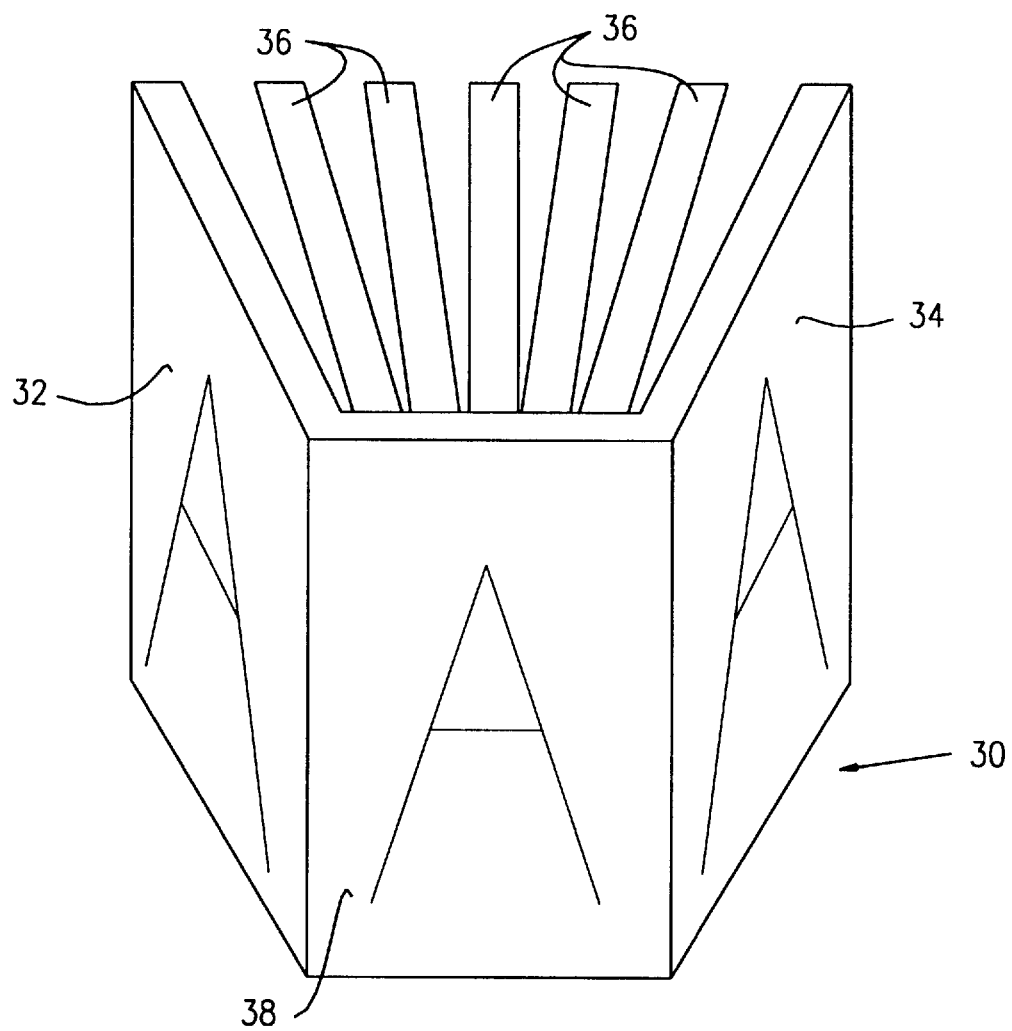
FIG. 2 depicts a side view of a book of the present invention.

Referring now to FIG. 2, the book 30 is comprised of a front cover 32, a back cover 34 and a plurality of interior pages 36. The covers 32 and 34 and the interior pages 36 are bound to spine 38 in any convenient manner known to those skill in the art.

Figure 3:
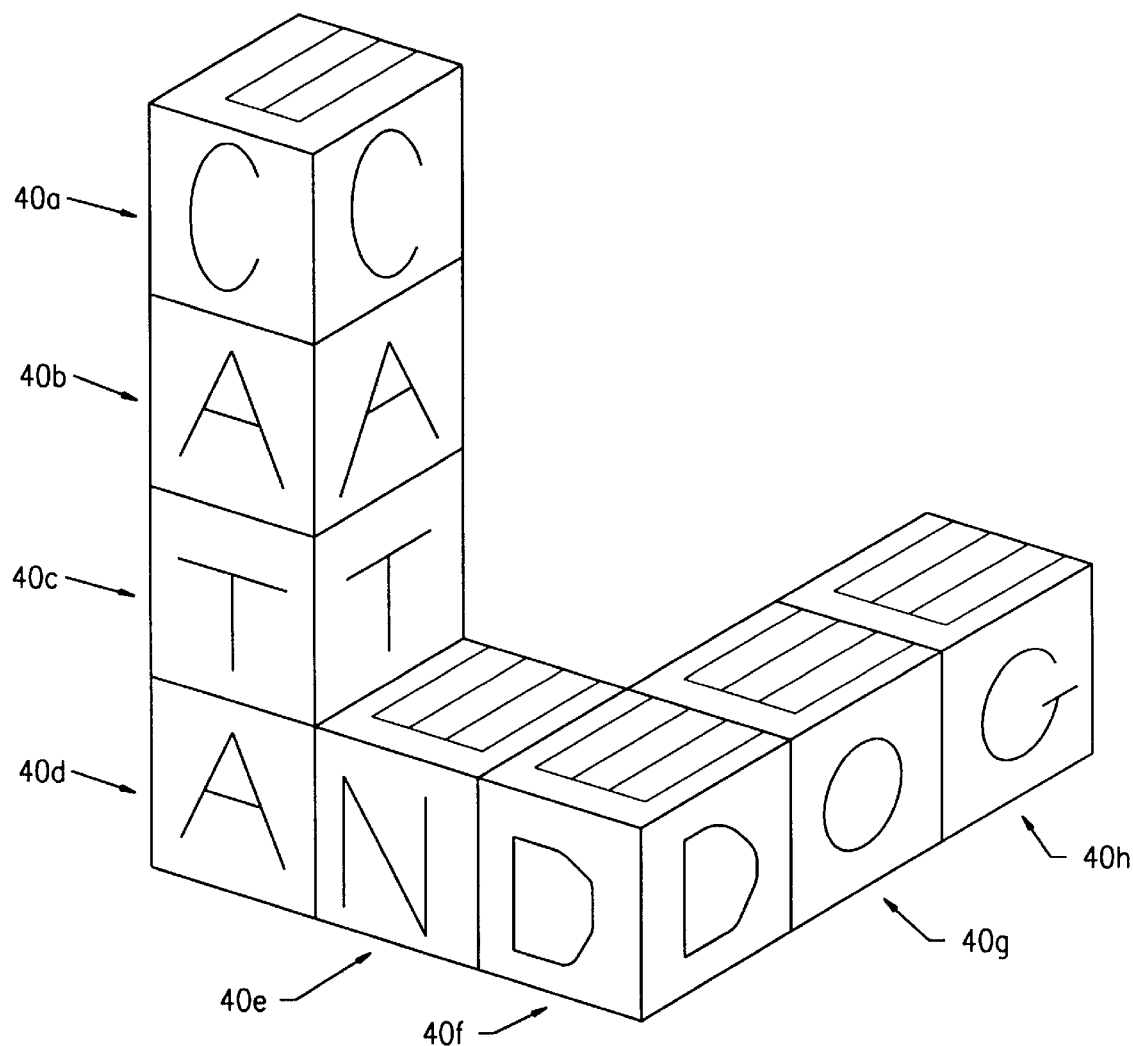
FIG. 3 depicts an embodiment of a group of books of the present invention which are used as blocks to spell words.

Referring to FIG. 3, there is shown an embodiment of a series of books 40a, 40b, 40c, 40d, 40e, 40f, 40g and 40h which are used as blocks to spell the phrase "cat and dog."

In a further embodiment of the present invention, it is contemplated that the books further include a means for facilitating their stacking or use as blocks, such as a hook-and-loop fastener means such as VELCRO, tie means, snap means. In the hook-and-loop fastener and snap-type embodiments at least one side of the book will be dedicated to a male fastening means and the other side will be dedicated to a female fastening means. Alternatively, the surface of the books may be coated with a material to increase the tackiness of the surface, such as waxes, thereby causing less slippage between the books during stacking.

Figure 4:
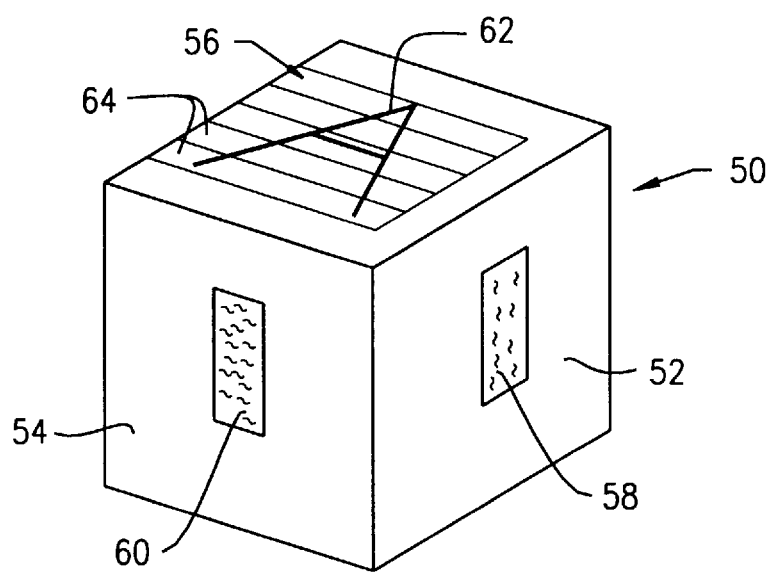
FIG. 4 depicts an angular top view of another embodiment of a book of the present invention.

An example of a book including such a hook-and-loop fastener VELCRO embodiment is shown in FIG. 4, wherein the book 50 has a spine side 52 which includes a female hook-and-loop fastener VELCRO patch 58 and a back cover 54 which includes a male hook-and-loop fastner velner patch 60. The hook-and-loop fastener patches 58 and 60 may be adhered to the book sides 52 and 54 in any manner known to those skilled in the art, preferably by gluing with an adhesive compound. On top side 56 with pages 64, there is printed across the width of the pages a character 62, which in the case of FIG. 4 is the letter "A." Again, any other suitable fastening means may be substituted for hook-and-loop fastener VELCRO patches 58 and 60.

In this manner, the female hook-and-loop fastener VELCRO patch of a first block will attach to the male hook-and-loop fastener VELCRO patch of a second block in order to provide improved stability in the connection between the two blocks.

Although it is preferred that the books of the present invention are constructed of paper and/or cardboard, it is contemplated that other materials may be used to construct the books, such as wood or foam rubbers.

Many variations of the present invention will suggest themselves to those skilled in the art in light of the above-detailed description. For example a series of the books can include any number of books such as ranging from 2 to 100 or more, preferably from about 10 to about 50 and more preferably from about 20 to about 30. The series of books can include indicia of letters alone, numbers alone, symbols alone, words alone or mixtures thereof. The books can be of any shape, and the shape of the book can be used to further relate to the theme of the book, such as triangular shaped book may have the character "T" or the word "triangle" imprinted thereon. All such obvious modifications are within the full intended scope of the appended claims.

The above mentioned patents are hereby incorporated by reference.

I claim:

1. An educational device comprising a series of books each said book being comprised of a front cover, a back cover and at least one interior page
   wherein each said book is adapted for use as a building block
   wherein each said book has a character, word or symbol printed on at least one outer surface of said book
   wherein said at least one interior page contains information related to the character, word or symbol printed on the outer surface of said book and
   wherein each said book has dimensions of x length, y width and z height wherein x:y ranges from 3:1 to 0.33:1, x:z ranges from 3:1 to 0.33.1 and y:z ranges from 3:1 to 0.33:1.

2. An educational device as defined in claim 1 wherein said character is a letter of the alphabet.

3. An educational device as defined in claim 1 wherein said character is a numeral.

4. An educational device as defined in claim 1 wherein said symbol is a mathematical symbol.

5. An educational device as defined in claim 1 wherein said symbol is a grammatical symbol.

6. An educational device as defined in claim 1 wherein x:y ranges from 2.5:1 to 0.4:1, x:z ranges from 2.5:1 to 0.4:1 and y:z ranges from 2.5:1 to 0.4:1.

7. An educational device as defined in claim 1 wherein x:y ranges from 2:1 to 0.5:1, x:z ranges from 2:1 to 0.5:1 and y:z ranges from 2:1 to 0.5:1.

8. An educational device as defined in claim 1 wherein at least one said book has the same or different character printed on at least three outer surfaces of said book.

9. An educational device as defined in claim 1 wherein each said book further comprises a means for facilitating the stacking of said books.

10. An educational device as defined in claim 9 wherein said means for facilitating stacking comprises hook-and-loop fasteners or a coating.

11. An educational device useful for teaching students to recognize letters, spell words and/or read comprised of a series of books wherein each of the books comprises a front cover, at least one interior page and a back cover and is adapted for use as a building block, wherein each of the books relates to at least one letter of the alphabet by imprinting the letter on one or more of the exterior sides of the book and wherein said at least one interior page has a theme the general topic of which is related to the letter imprinted on the side of the book and wherein each said book has dimensions of x length, y width and z height wherein x:y ranges from 3:1 to 0.33:1, x:z ranges from 3:1 to 0.33:1 and y:z ranges from 3:1 to 0.33:1.

12. An educational device as defined in claim 11 wherein at least one of the books of the series of books has a first letter printed on one exterior side and a second letter different from the first letter printed on a second exterior side, and further has at least two interior pages, one of which has a theme the general topic of which is related to said first letter and the second of which has a theme the general topic of which is related to the second letter.

13. An educational device useful for teaching students to recognize numbers and/or learn basic arithmetic symbols comprised of a series of books wherein each of the books comprises a front cover, at least one interior page and a back cover and is adapted for use as a building block, wherein each of the books relates to at least one numeral or arithmetic symbol by imprinting the numeral or arithmetic symbol on one or more of the exterior sides of the book and wherein said at least one interior page has a theme the general topic of which is related to the numeral or arithmetic symbol imprinted on the side of the book and wherein each said book has dimensions of x length, y width and z height wherein x:y ranges from 3:1 to 0.33:1, x:z ranges from 3:1 to 0.33:1 and y:z ranges from 3:1 to 0.33:1.

14. An educational device as defined in claim 13 wherein at least one of the books of the series of books has a first numeral or arithmetic symbol printed on one exterior side and a second numeral or arithmetic symbol different from the first numeral or arithmetic symbol printed on a second exterior side, and further has at least two interior pages, one of which has a theme the general topic of which is related to said first numeral or arithmetic symbol and the second of which has a theme the general topic of which is related to the second numeral or arithmetic symbol.

15. An educational device useful for teaching students to read and/or learn sentence structure comprised of a series of books wherein each of the books comprises a front cover, at least one interior page and a back cover and is adapted for use as a building block, wherein each of the books relates to at least one word or grammatical symbol by imprinting the word or grammatical symbol on one or more of the exterior sides of the book and wherein said at least one interior page has a theme the general topic of which is related to the word or grammatical symbol imprinted on the side of the book and wherein each said book has dimensions of x length, y width and z height wherein x:y ranges from 3:1 to 0.33:1, x:z ranges from 3:1 to 0.33:1 and y:z ranges from 3:1 to 0.33:1.

16. An educational device as defined in claim 15 wherein at least one of the books of the series of books has a first word or grammatical symbol printed on one exterior side and a second word or grammatical symbol different from the first word or grammatical symbol printed on a second exterior side, and further has at least two interior pages, one of which has a theme the general topic of which is related to said first word or grammatical symbol and the second of which has a theme the general topic of which is related to the second word or grammatical symbol.

* * * * *